(12) United States Patent
Guo et al.

(10) Patent No.: US 9,118,063 B2
(45) Date of Patent: Aug. 25, 2015

(54) FIBER MAT FOR BATTERY PLATE REINFORCEMENT

(75) Inventors: Zhihua Guo, Centennial, CO (US); Souvik Nandi, Highlands Ranch, CO (US); Jawed Asrar, Englewood, CO (US); Albert G. Dietz, III, Littleton, CO (US)

(73) Assignee: Johns Manville, Denver, CO (US)

(*) Notice: Subject to any disclaimer, the term of this patent is extended or adjusted under 35 U.S.C. 154(b) by 204 days.

(21) Appl. No.: 13/562,468

(22) Filed: Jul. 31, 2012

(65) Prior Publication Data

US 2014/0038023 A1   Feb. 6, 2014

(51) Int. Cl.
| | |
|---|---|
| H01M 4/20 | (2006.01) |
| H01M 4/18 | (2006.01) |
| H01M 4/16 | (2006.01) |
| H01M 4/70 | (2006.01) |
| H01M 2/16 | (2006.01) |
| H01M 4/36 | (2006.01) |
| H01M 4/76 | (2006.01) |
| H01M 10/06 | (2006.01) |
| H01M 10/12 | (2006.01) |

(52) U.S. Cl.
CPC .......... *H01M 2/1613* (2013.01); *H01M 2/1666* (2013.01); *H01M 2/1686* (2013.01); *H01M 4/20* (2013.01); *H01M 4/366* (2013.01); *H01M 2/1653* (2013.01); *H01M 4/76* (2013.01); *H01M 10/06* (2013.01); *H01M 10/12* (2013.01); *Y02E 60/126* (2013.01); *Y10T 29/49115* (2015.01); *Y10T 156/10* (2015.01)

(58) Field of Classification Search
CPC combination set(s) only.
See application file for complete search history.

(56) References Cited

U.S. PATENT DOCUMENTS

| | | | | |
|---|---|---|---|---|
| 4,216,280 A | * | 8/1980 | Kono et al. | 429/247 |
| 4,336,314 A | * | 6/1982 | Yonezu et al. | 429/66 |
| 4,606,982 A | * | 8/1986 | Nelson et al. | 429/59 |
| 4,873,157 A | | 10/1989 | Flicker et al. | |
| 2011/0318643 A1 | * | 12/2011 | Clement et al. | 429/247 |

FOREIGN PATENT DOCUMENTS

| | | | |
|---|---|---|---|
| DE | 20 2004 020668 U1 | 12/2005 | |
| EP | 2 390 947 A1 | 11/2011 | |
| FR | 2937799 | * 4/2010 | H01M 4/68 |
| WO | 2013/053957 A1 | 4/2013 | |

* cited by examiner

*Primary Examiner* — Yoshitoshi Takeuchi
(74) *Attorney, Agent, or Firm* — Robert D. Touslee (57) ABSTRACT

Embodiments of the invention provide batteries, electrodes, and methods of making the same. According to one embodiment, a battery may include a positive plate having a grid pasted with a lead oxide material, a negative plate having a grid pasted with a lead based material, a separator separating the positive plate and the negative plate, and an electrolyte. A nonwoven glass mat may be in contact with a surface of either or both the positive plate or the negative plate to reinforce the plate. The nonwoven glass mat may include a plurality of first coarse fibers having fiber diameters between about 6 μm and 11 μm and a plurality of second coarse fibers having fiber diameters between about 10 μm and 20 μm.

11 Claims, 12 Drawing Sheets

FIBER MAT FOR BATTERY PLATE REINFORCEMENT

BACKGROUND OF THE INVENTION

Electrodes or electrode plates commonly used in lead-acid batteries often include a metallic grid that is used to support lead and/or lead oxide pastes. During charge and discharge cycles, the volume of the lead and/or lead oxide paste typically expands and contracts. Repeated usage and, thus, repeated charge and discharge cycles may have negative effects on the electrode, such as shedding of the active material particles of the lead and/or lead oxide pastes. To reduce these negative effects, the electrode may be reinforced with paper to keep the lead or lead oxide paste intact. While paper generally provides sufficient tensile strength for the reinforcement application, a potential problem with paper is its vulnerability to degradation in the harsh chemical environment within the battery. Degradation often weakens the paper rendering it less effective or ineffective for its reinforcement purpose.

BRIEF SUMMARY OF THE INVENTION

Embodiments of the invention provide nonwoven fiber mats that can be used to reinforce plates in lead-acid batteries, or other batteries. According to one aspect, a lead-acid battery is provided. The lead acid battery includes a positive plate having a grid of lead alloy material pasted with a lead oxide material and a negative plate having a grid of lead alloy material pasted with a lead based material. A separator is used to separate the positive plate and the negative plate and the battery also includes an electrolyte. A nonwoven glass mat is in contact with a surface of the positive plate and/or the negative plate to reinforce the plate. The nonwoven glass mat includes a plurality of first coarse fibers having fiber diameters between about 6 µm and about 11 µm and a plurality of second coarse fibers having fiber diameters between about 10 µm and about 20 µm.

The nonwoven glass mat may have a thickness of 0.009 inches or less and a tensile strength of at least 35 lbs/3 inch. In one embodiment, the nonwoven glass mat has a thickness of 0.008 inches or less and a tensile strength of at least 40 lbs/3 inch.

According to another aspect, a plate or electrode for a lead-acid battery is provided. The plate or electrode includes a grid of lead alloy material and a paste of an active material applied to the grid of lead alloy material. A nonwoven fiber mat is disposed on a surface of, or within, the paste of the active material. The nonwoven fiber mat includes a plurality of first coarse fibers having fiber diameters between about 6 µm and about 11 µm and a plurality of second coarse fibers having fiber diameters between about 10 µm and about 20 µm.

According to one embodiment, the fibers of the nonwoven fiber mat include: glass fibers, polyolefin fibers, and/or polyester fibers. The nonwoven fiber mat has a tensile strength in the machine direction of at least 20 lbs/3 inch. The nonwoven fiber mat may also have a tensile strength in the cross-machine direction of at least 10 lbs/3 inch. The nonwoven fiber mat has a mat thickness of about 0.009 inches or less, and more commonly a thickness of between about 0.006 inches and 0.008 inches. In one embodiment, the first and second coarse fibers have fiber lengths between about ⅓ inch and about 1½ inch. In another embodiment, the first and second coarse fibers have fiber lengths between about ½ inch and about ¾ inch. In yet another embodiment, the first coarse fibers and/or the second coarse fibers include fibers having a fiber length of at least ⅓ inch. In a further embodiment, the first coarse fibers and/or the second coarse fibers include fibers having a fiber length of at least ½ inch.

The nonwoven fiber mat may include between about 25% and 75% of the first coarse fibers and between 25% and 75% of the second coarse fibers. In another embodiment, the nonwoven fiber mat includes about 50% of the first coarse fibers and about 50% of the second coarse fibers. The nonwoven fiber mat may be disposed within the paste of the active material between about 0.001 inches and about 0.020 inches from the surface of the paste or plate.

In one embodiment, an additional nonwoven fiber mat is disposed on an opposite surface of the paste of the active material so that the paste of the active material and the electrode are disposed between two nonwoven fiber mats. The two nonwoven fiber mats may be opposite sides of a bag that encloses or envelopes the paste of the active material and the electrode.

The nonwoven fiber mat may further include a binder that is applied to the mat between about 10% and 45% by weight of the mat. In another embodiment, the binder may be applied to the mat between about 20% and 30% by weight of the mat.

According to another aspect, a method of manufacturing a plate of a lead-acid battery is provided. The method includes providing a grid of lead alloy material, applying a paste of an active material to the grid of lead alloy material to form a battery plate or electrode, and applying a nonwoven fiber mat to a surface of the paste of the active material. The nonwoven glass mat includes a plurality of first coarse fibers having fiber diameters between about 6 µm and about 11 µm and a plurality of second coarse fibers having fiber diameters between about 10 µm and about 20 µm.

According to one embodiment, the nonwoven fiber mat is applied to a bottom surface of the grid of lead alloy material prior to application of the paste of the active material and the method further includes applying a second nonwoven fiber mat to a top surface of the paste of the active material so that the grid of lead alloy material is disposed between two nonwoven fiber mats.

The method may also include providing an additional grid of lead alloy material, applying a paste of an additional active material to the additional grid of lead alloy material to form an additional battery plate or electrode (the additional active material being either a lead based material or a lead oxide material), positioning a separator mat between the battery plate and the additional battery plate to form a battery cell assembly, positioning the battery cell assembly within a casing, and saturating the battery cell assembly with an electrolyte.

The nonwoven fiber mat may have a thickness of 0.009 inches or less and a tensile strength of at least 30 lbs/3 inch. According to another embodiment, the nonwoven glass mat may have a thickness of 0.008 inches or less and a tensile strength of at least 40 lbs/3 inch.

BRIEF DESCRIPTION OF THE DRAWINGS

The present invention is described in conjunction with the appended figures:

FIGS. 7A-10B illustrate various examples of nonwoven fiber mats having fiber compositions similar to those described herein.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

Embodiments of the invention provide nonwoven fiber mats that can be used to reinforce plates in lead-acid batteries, or other batteries. The nonwoven fiber mats may replace other plate reinforcement means, such as paper, that are currently used in lead-acid or other batteries. The nonwoven fiber mats provide several advantages over the current plate reinforcement means. For example, the nonwoven fiber mats do not dissolve in the electrolyte (e.g., sulfuric acid); they provide vibration resistance, reduce plate shedding, and/or strengthen or reinforce the plate; and they provide good dimensional stability, which may allow easier guiding or handling during battery plate manufacturing processes.

The nonwoven fiber mats described herein also provide excellent strength properties as well as decreased mat size or thickness when compared to conventional fiber mats. These strength properties reinforce the plates while the decreased mat thickness reduces the overall volume that the mat occupies, thereby allowing an increased amount of electrolyte and/or active material paste to be used within the lead-acid battery, which increases the electrochemical process and, thus, the overall usefulness of the lead-acid battery. The thinner nonwoven mats also improve processing efficiency by increasing the mat footage on the processing rolls, thereby reducing the frequency of roll changing. The nonwoven fiber mats may be less than 10 mils thick (i.e., 0.010 inches), and more commonly less than 9 mils thick (i.e., 0.009 inches). In one embodiment, the nonwoven fiber mats are about 6 mils and 8 mils or between about 6 mils and 7 mils thick.

The nonwoven fiber mats may have a total tensile strength of at least 30 lbs/3 inch and more commonly at least 35 lbs/3 inch. To achieve this tensile strength, the nonwoven fiber mat may have a tensile strength in the machine direction of at least 22 lbs/3 inch and a tensile strength in the cross-machine direction of at least 13 lbs/3 inch. The description of "lbs/3 inch" generally refers to a method of testing the mat strength where a 3 inch by 12 inch rectangular piece of the fiber mat is subjected to a tensile stress until the mat fails, such as by ripping or tearing. Mats having tensile strengths less than 22 lbs/3 inch in the machine direction and less than 13 lbs/3 inch in the cross-machine direction may not have sufficient strength to withstand winding and rewinding during processing and/or to reinforce plates of a lead-acid or other battery.

The nonwoven fiber mats may include glass fibers, polyolefin fibers, polyester fibers, and the like. The description herein will mainly describe using glass fibers, although it should be realized that these and other fibers may be used. Preferably, any other fiber that is used should be able to withstand the acidic environment inside lead-acid or other batteries. The nonwoven fiber mats described herein include a blend of two or more different sized coarse diameter fibers. The description of coarse diameter fibers generally includes fibers ranging in diameter between about 6 μm and about 22 μm in one embodiment, and between about 8 μm and about 20 μm in another embodiment.

For example, in one embodiment, the nonwoven fiber mats include a blend of first glass fibers having fiber diameters in the range of between 6 μm and 11 μm with second glass fibers having fiber diameters in the range of between 10 μm and 20 μm. In one embodiment, the nonwoven fiber mats include at least 25% of each of the first and second glass fibers. The glass fibers typically have fiber lengths that range between about ⅓ of an inch to about 1½ inches, although fiber lengths are more commonly about ⅓ inch to ¾ inch or 1 inch. The nonwoven fibers mats also include a binder that bonds the glass fibers together. The binder is typically applied to the glass fibers so that the binder comprise between about 10% and 45% by weight of the nonwoven fiber mat, between about 15% and 35% by weight of the nonwoven fiber mat, and more commonly comprises between about 20% and 30% by weight of the nonwoven fiber mat. The binder is generally a chemically-resistant binder (e.g., an acrylic binder) that delivers the durability to survive in the acid environment throughout the life of the battery, the strength to survive the plate pasting operation, and the permeability to enable paste penetration.

The blended fiber mats described herein and/or battery plates or electrodes reinforced with such mats may provide several advantages over conventional fiber mats, battery plates, and/or electrodes. For example, the described blended fiber mats may reduce the amount of active material (e.g., lead) used for the battery plate/electrode and, thus, reduce the overall thickness of the battery plate/electrode. This reduced thickness may be especially common in positive plates. The use of the described blended fiber mats may reduce the need to use more active material, such as lead, to provide strength to the plate. Further, the exposed surface area of the active material (e.g., lead) may increase, which is beneficial for the electrochemical reactions. Additionally, use of the described blended fiber mats may increase the cranking current with the appropriate design of other battery parts.

Having described several embodiments of the invention, additional aspects will be more apparent with reference to the figures described below.

Electrode, Battery, and Mat Configurations

Figure 1:
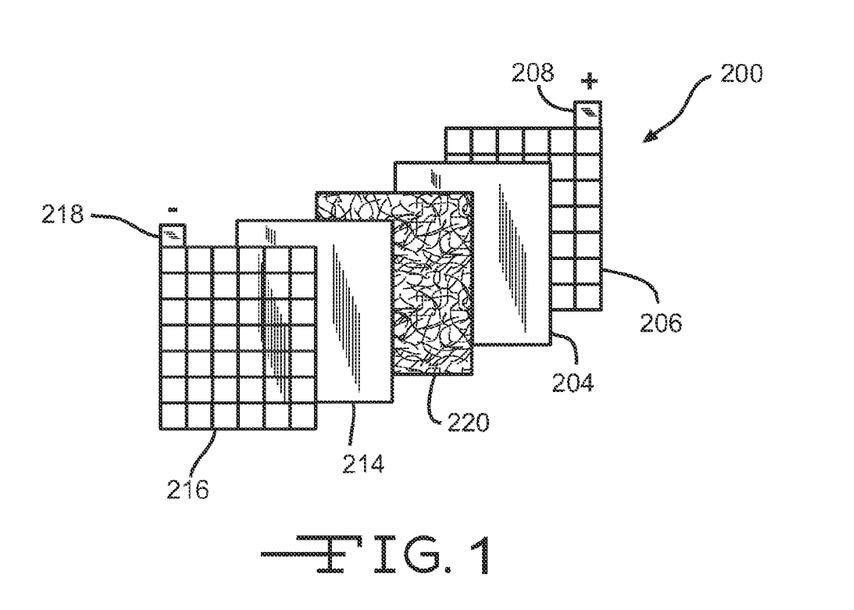
FIG. 1 illustrates an exploded perspective view of a battery cell assembly.
Figure 2:
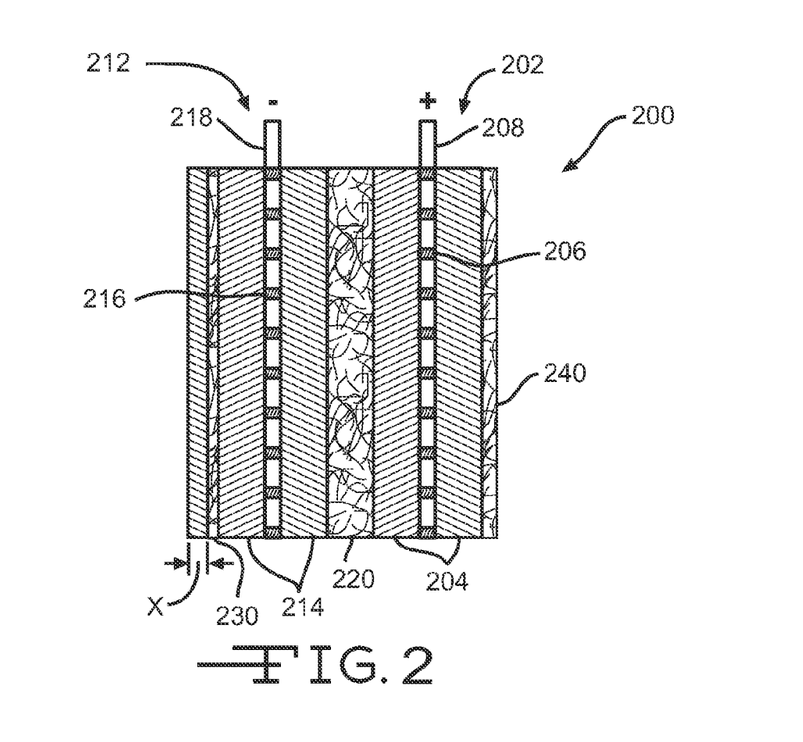
FIG. 2 illustrates an assembled cross section view of the battery cell assembly of FIG. 1.

FIGS. 1 and 2, respectively, show a perspective exploded view of a lead-acid battery cell 200 and a cross-section assembled view of the lead-acid battery cell 200. Each cell 200 may provide an electromotive force (emf) of about 2.1 volts and a lead-acid battery may include 3 such cells 200 connected in series to provide an emf of about 6.3 volts or may include 6 such cells 200 connected in series to provide an emf of about 12.6 volts, and the like. Cell 200 includes a positive plate or electrode 202 and a negative plate or electrode 212 separated by battery separator 220. Positive electrode 202 includes a grid or conductor 206 of lead alloy material. A positive active material 204, such as lead dioxide, is typically coated or pasted on grid 206. Grid 206 is also electrically coupled with a positive terminal 208. Grid 206 provides structural support for the positive active material 204 along with electrical conductivity to terminal 208.

Likewise, negative electrode 212 includes a grid or conductor 216 of lead alloy material that is coated or pasted with a negative active material 214, such as lead. Grid 216 is electrically coupled with a negative terminal 218. Like grid 206, grid 216 structurally supports the negative active material 214 along with providing electrical conductance to terminal 218. Positive electrode 202 and negative electrode 212 are immersed in an electrolyte (not shown) that may include sulfuric acid and water. Battery separator 220 is positioned between positive electrode 202 and negative electrode 212 to physically separate the two electrodes while enabling ionic transport, thus completing a circuit and allowing an electronic current to flow between positive terminal 208 and negative terminal 218. Separator 220 typically includes a microporous membrane that has negligible conductance and may be any type of separator known in the art (e.g., AGM, polyolefin mat, and the like).

Figure 3A:
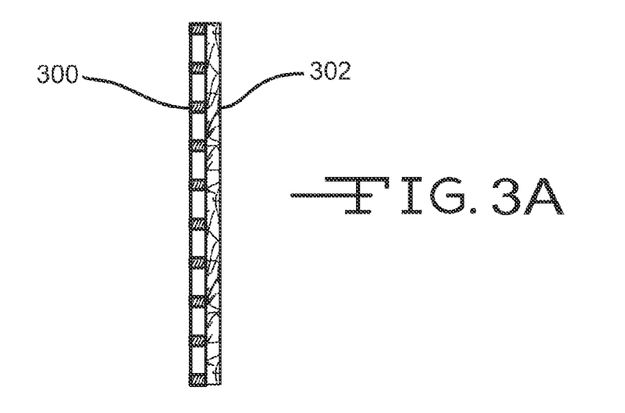
FIGS. 3A-3C illustrate cross section views of various configurations of an electrode or plate and a nonwoven fiber mat.
Figure 3B:
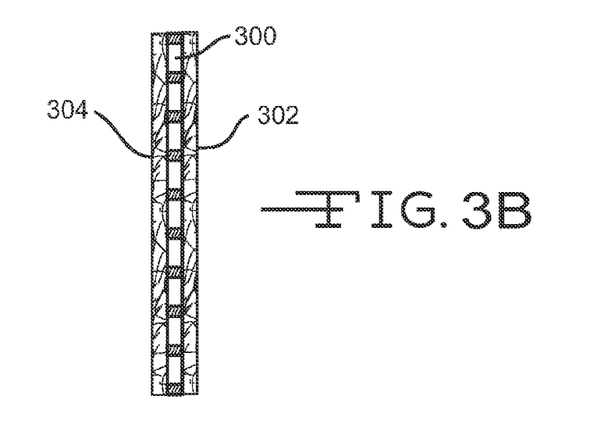
Figure 3C:
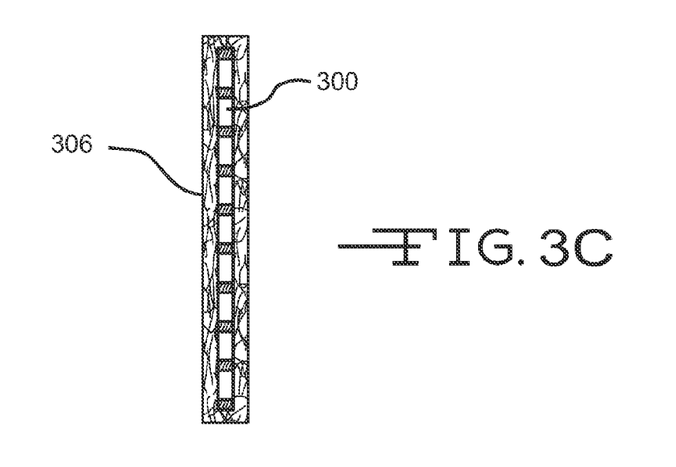

Positioned near a surface of negative electrode 212 is a nonwoven fiber mat 230 (also referred to herein as a nonwoven glass mat or a glass mat). Glass mat 230 is disposed partially or fully over the surface of negative electrode 212 so as to partially or fully cover the surface. As shown in FIGS. 3A-3C, glass mat 230 may be disposed on both surfaces of the negative electrode 212, or may fully envelope or surround the electrode. Likewise, although glass mat 230 is shown on the outer surface of the electrode 212, in some embodiments glass mat 230 may be positioned on the inner surface of the electrode 212 (i.e., adjacent separator 220). Glass mat 230 provides an additional supporting component for the negative active material 214. The additional support provided by glass mat 230 may help reduce the negative effects of shedding of the negative active material particles as the active material layer softens from repeated charge and discharge cycles, thereby reducing the degradation commonly experienced by repeated usage of lead-acid batteries.

Glass mat 230 is often impregnated or saturated with the negative active material 214 so that the glass mat 230 is partially or fully disposed within the active material 214 layer. Impregnation or saturation of the active material within the glass mat means that the active material penetrates into the glass mat. For example, glass mat 230 may be fully impregnated with the negative active material 214 so that glass mat 230 is fully buried within the negative active material 214 (i.e., fully buried within the lead paste). Fully burying the glass mat 230 within the negative active material 214 means that the glass mat is entirely disposed within the negative active material 214. In one embodiment, glass mat 230 may be disposed within the negative active material 214 up to about a depth X of about 20 mils (i.e., 0.020 inches) from an outer surface of the electrode 212. In other embodiments, the glass mat 230 may rest atop the negative active material 214 so that the glass mat is impregnated with very little active material. Often the glass mat 230 will be impregnated with the negative active material 214 so that the outer surface of the glass mat forms or is substantially adjacent the outer surface of the electrode 212 (see glass mat 240). In other words, the active material may fully penetrate through the glass mat 230 so that the outer surface of the electrode 212 is a blend or mesh of active material and glass mat fibers.

Similarly, positioned near a surface of positive electrode 202 is a nonwoven fiber mat or glass mat 240. Glass mat 240 may be arranged and/or coupled with positive electrode 202 similar to the arrangement and coupling of glass mat 230 with respect to negative electrode 212. For example, glass mat 240 may be disposed partially or fully over the surface of positive electrode 202 so as to partially or fully cover the surface, may be positioned on an inner surface of the electrode 202 (i.e., adjacent separator 220) instead of the shown outer surface configuration, and/or may be impregnated or saturated with the positive active material 204 so that the glass mat 240 is partially or fully disposed within the active material 204 layer. Like glass mat 230, glass mat 240 also provides additional support to help reduce the negative effects of shedding of the positive active material particles due to repeated charge and discharge cycles.

The thickness of the glass mat is typically a function of mat weight, binder content (LOI), and fiber diameter. The type of binder used and the length of the fibers may be weaker factors in determining the glass mat thickness. Higher binder content, however, generally reduces the glass mat thickness, although excessive binder use may pose various processing challenges during mat production and thereafter. A lower mat weight may also reduce the mat thickness. The mat weight, however, may also be limited because the mat needs to provide enough tensile strength during winding and downstream processes.

Blending coarse glass fibers, and preferably fibers in the range of 6-11 μm and 10-20 μm, or any of the other ranges specified herein, may produce a mat having sufficient mat thickness and strength. For example, completely replacing coarse fibers (e.g., fibers between 10-20 μm) with finer fibers (e.g., fibers ranging between 6-11 μm) may significantly drop the strength of the mat and/or pose processing problems downstream, such as mat breakage when applying a lead, or lead oxide, paste during a plate reinforcement process. Additionally, to enable dispersion in a white water solution, some of the fibers may need to be chopped shorter, which may reduce the tensile and/or tear strength of the glass mat. For example, 11 μm fibers may need to be chopped to a length of ½ inch instead of ¾ inch, although in other embodiments 11 μm ¾ inch fibers are used. The glass mat fiber combinations described herein provide an ideal range of thinness and strength. For example, in one embodiment, finer glass fibers (e.g., fiber diameters between 6-11 μm) are blended with more coarse fibers (e.g., fiber diameters between 10-20 μm), which decreases mat thickness while maintaining sufficient mat strength. The blended coarse fibers may have roughly the same or similar lengths, which may provide a mat having improved or increased tensile strength. For example, 11 μm ¾ inch fibers may be blended with 13 μm ¾ inch fibers, which may produce a mat having improved tensile strength when compared to a mat having single diameter coarse fibers (e.g., 13 μm ¾ inch fibers). Further, the weight of the blended mat may be kept roughly constant or decreased.

Glass mats 230 and 240 (referred to hereinafter as glass mat 230) include a blend of two or more different diameter coarse fibers. In one embodiment, glass mat 230 includes a plurality of first coarse fibers, having fiber diameters ranging between about 6 μm and about 13 μm, between about 6 μm and about 11 μm, or between about 8 μm and about 13 μm. The first coarse fibers are blended with a plurality of second coarse fibers, having fiber diameters ranging between about 10 μm and about 20 μm or between about 13 μm and about 20 μm. In another embodiment, glass mat 230 includes a blend of first coarse fibers having fiber diameters between 6-11 μm or 8-11 μm and second coarse fibers having fiber diameters between 10-20 µm or 13-20 µm. The blend of the two or more different diameter coarse fibers results in a mat that is sufficiently strong to structurally support the active material as described above and to withstand the various plate manufacturing processes while also minimizing the thickness and overall size of the mat. Since glass mat 230 is a chemically and electrically inactive component and, thus, does not contribute to the battery's electrochemical process, reduced glass mat size is important in order to minimize the battery's volume of non-electrochemically contributing components.

In one embodiment, glass mat 230 includes a blend of between 10% and 90% of the first coarse fibers and between 10% and 90% of the second coarse fibers. In another embodiment, glass mat includes a blend of between 25% and 75% of the first coarse fibers and between 25% and 75% of the second coarse fibers. In yet another embodiment, the blend of first coarse fibers and second coarse fibers is approximately equal (i.e., 50% of the first and second coarse fibers).

The length of the coarse fibers also contributes to the overall strength of glass mat 230 by physically entangling with adjacent fibers or fiber bundles and/or creating additional contact points where separate fibers are bonded via an applied binder. In one embodiment, the first and second coarse fibers have fiber lengths that range between about ⅓ inch and about 1½ inches, although an upper length limit of 1¼ inch is more common. This range of lengths provides sufficient mat strength while allowing the fibers to be dispersed in a white water solution for mat processing applications. In another embodiment, the first and second coarse fibers have fiber lengths that range between ½ and ¾ of an inch. The fibers lengths of the first coarse fibers may be different than the fibers lengths of the second coarse fibers. For example, in one embodiment, the first fibers may have an average fiber length of about ⅓ inch while the second coarse fibers have an average fiber length of about ¾ inch. In one embodiment, either or both the first or second coarse fibers have an average fiber length of at least ⅓ inch, while in another embodiment, either or both the first or second coarse fibers have an average fiber length of at least ½ inch.

The type and amount of binder used to bond the first and second coarse fibers together also contributes to the overall strength and thickness of glass mat 230. As described above, the binder is generally a chemically-resistant binder (e.g., an acrylic binder) that delivers the durability to survive in the acid environment throughout the life of the battery, the strength to survive the plate pasting operation, and the permeability to enable paste penetration. Increased binder usage may reduce the thickness of glass mat 230 by creating more fiber bonds and densifying glass mat 230. The increased fibers bonds may also strengthen glass mat 230. In one embodiment, the binder is applied to the first and second coarse fibers such that the binder comprises between about 10% and 45% by weight of the glass mat 230 or between about 15% and 35% by weight of the glass mat. In another embodiment, the binder is applied to the first and second coarse fibers such that it comprises between about 20% and 30% by weight of the glass mat 230.

The above described glass mat 230 configurations provide mats having a total tensile strength of at least 30 lbs/3 inch and more commonly at least 35 lbs/3 inch. Specifically, the glass mats 230 have a tensile strength in the machine direction of at least 22 lbs/3 inch and a tensile strength in the cross-machine direction of at least 13 lbs/3 inch. The above described mats have been found to have sufficient strength to support the active material and to withstand the various stresses imposed during plate or electrode manufacturing and processing (e.g., pasting or applying the active material). Glass mats 230 that do not have the above described tensile strength attributes may not be sufficiently strong to support the applied active material (e.g., prevent shedding and the like) and/or may pose processing issues, such as mat breakage when applying the active material (e.g., lead or lead oxide) paste on the glass mat during the plate reinforcement process.

Further, the above described glass mat 230 configuration provide mats that have a thickness of 10 mils or less (i.e., 0.010 inches) and more commonly 9 mils or less (0.009 inches). In one embodiment, the glass mats 230 have a thickness in the range of between about 6 and 8 mils (i.e., 0.006 and 0.008 inches), and preferably about 7 mils. These mats occupy minimal space within the electrode and battery interior although for additional electrochemically active materials (e.g., additional electrolyte and/or lead or lead oxide paste) to be used, thereby increasing the life and efficiency of the battery. The above described mats have the unique combination of both minimal size or thickness and strength. The mats may also have a pore size that ranges between 50 microns-5 mm.

Referring now to FIGS. 3A-3C, illustrated are various electrode-glass mat configurations. FIG. 3A illustrates a configuration where an electrode 300 has a single glass mat 302 disposed on or near an outer surface. This configuration may be similar to that described above for FIG. 2. The glass mat 302 may partially or fully cover the outer surface of electrode 300. The configuration of FIG. 3B is similar to that of FIG. 3A except that an additional glass mat 304 is disposed on or near an opposite surface of electrode 300 so that electrode 300 is sandwiched between the two glass mats, 302 and 304. Like glass mat 302, mat 304 may partially or fully cover the opposite surface of electrode 300. FIG. 3C illustrates a configuration where a glass mat 306 fully envelopes or surrounds electrode 300. Glass mat 306 functions similar to a bag in which electrode 300 is placed.

Processes and Methods

Figures 4, 5:
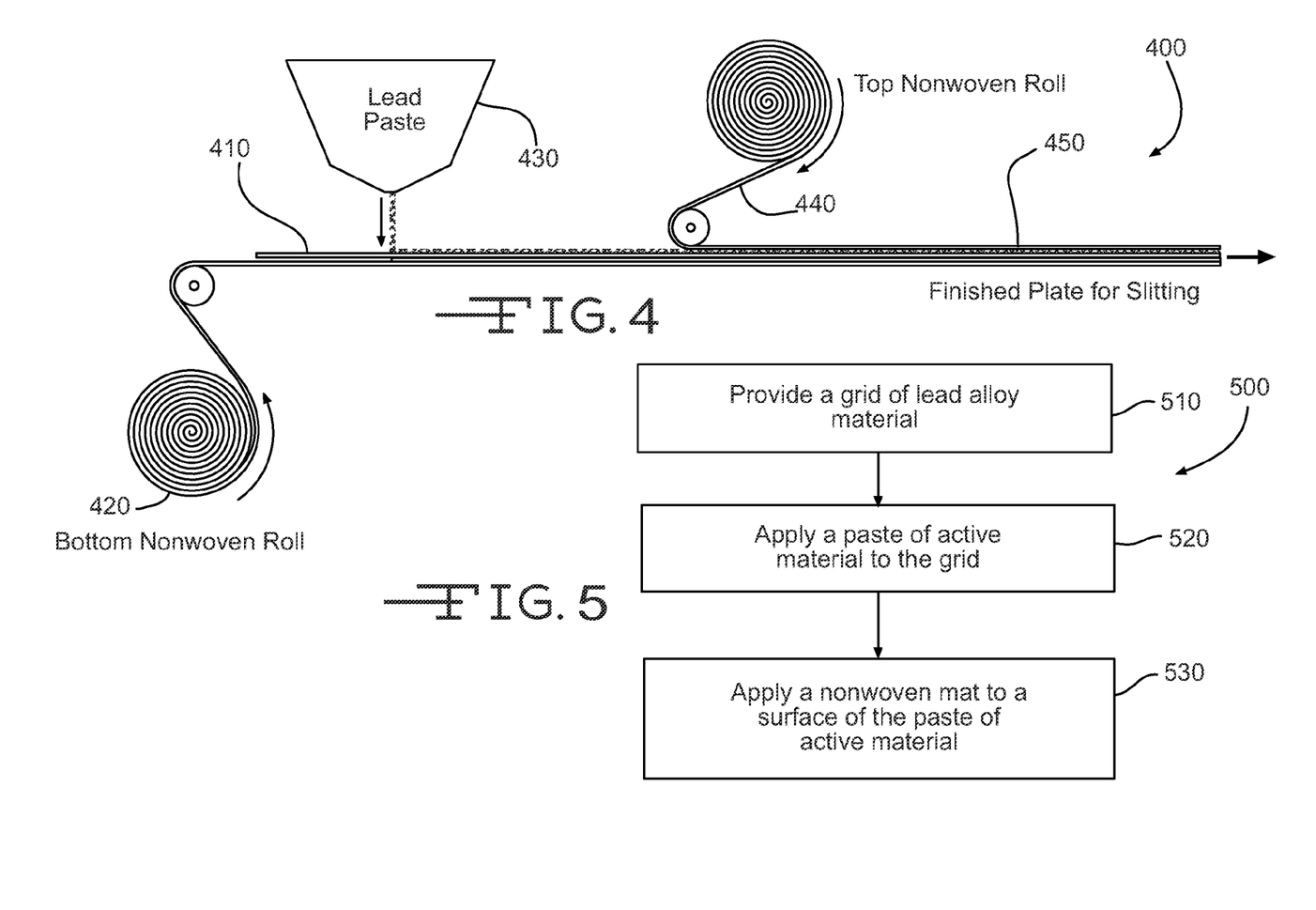
FIG. 4 illustrates a process for preparing an electrode or plate having a nonwoven fiber mat disposed on or near a surface of the electrode or plate.
FIG. 5 illustrates a method of manufacturing an electrode or plate having a nonwoven fiber mat disposed on or near a surface of the electrode or plate.

Referring now to FIG. 4, illustrated is a process 400 for manufacturing an electrode. The process may involve transporting a lead alloy grid 410 on a conveyor toward an active material 430 applicator (e.g., lead or lead oxide paste applicator), which applies or pastes the active material 430 to the grid 410. A nonwoven mat roll 420 may be positioned below grid 410 so that a nonwoven mat including a blend of coarse fibers as described herein may be applied to a bottom surface of the grid 410. Similarly, a nonwoven mat roll 440 may be positioned above grid 410 so that a nonwoven mat including a blend of coarse fibers (similar to or different from mat 420) may be applied to a top surface of the grid 410. The resulting electrode or plate 450 may subsequently be cut to length via a plate cutter (not shown). As described herein, the active material 430 may be applied to the grid 410 and/or top and bottom mats, 440 and 420, so that the active material impregnates or saturates the mats to a desired degree.

Referring now to FIG. 5, illustrated is a method 500 of manufacturing a plate or electrode of a lead-acid or other battery. At block 510, a grid of lead alloy material is provided. At block 520, a paste of an active material is applied to the grid of lead alloy material. The active material paste may be a lead material or a lead oxide material depending on if the plate or electrode is to be a positive or negative plate. At block 530, a nonwoven fiber mat (e.g., a glass mat) as described herein is applied a surface of the paste of the active material, which may include impregnating or saturating the nonwoven fiber mat as described herein. It should be noted that the illustrated steps of method 500 need not occur in a sequential manner so that the application of the nonwoven fiber mat occurs before the application of the active material paste. For example, in one embodiment, a nonwoven fiber mat is applied to a bottom surface of the lead alloy grid, the paste of active material is applied to the grid of lead alloy material and/or to the nonwoven mat as in block 520, and then a second nonwoven fiber mat is applied to a top surface of the paste of active material. As described herein, the nonwoven fiber mat includes a blend of a plurality of first coarse fibers and a plurality of second coarse fibers. The first coarse fibers may have fiber diameters ranging between about 6 µm and about 13 µm, 6 µm and 11 µm, 8 µm and 11 µm, and the like, and the second coarse fibers may have fiber diameters ranging between about 10 µm and about 20 µm, 13 µm and about 20 µm, and the like.

Figure 6:
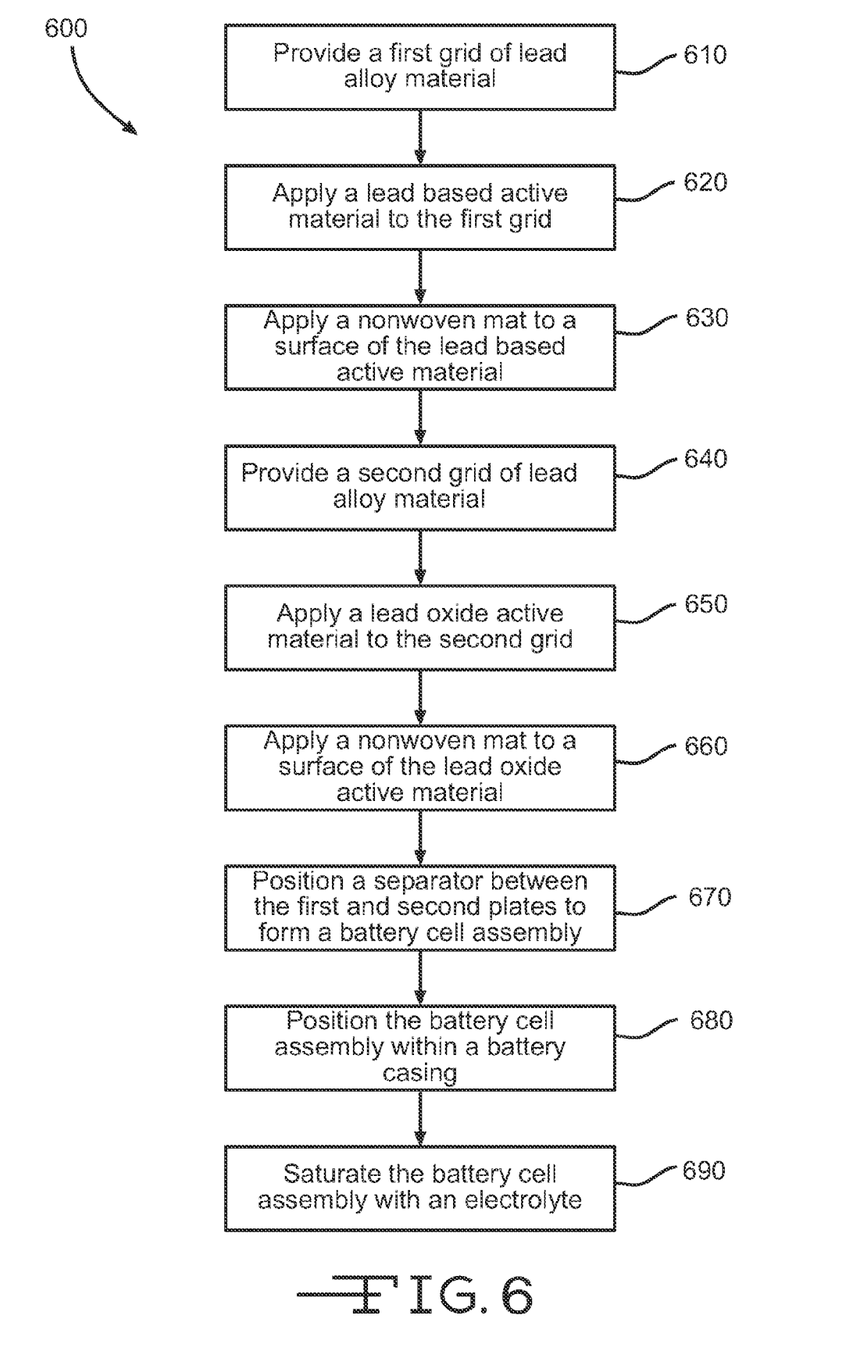
FIG. 6 illustrates a method of manufacturing a battery cell assembly.

Referring now to FIG. 6, illustrated is a method 600 of manufacturing a battery cell assembly of a lead-acid or other battery. At block 610, a first grid of lead alloy material is provided. At block 620, a lead based active material paste is applied to the first grid of lead alloy material to form a negative plate or electrode. At block 630, a nonwoven fiber mat as described herein is applied a surface of the lead based active material paste, which may include impregnating or saturating the nonwoven fiber mat as described herein. As described in FIG. 5, the illustrated steps need not occur in a sequential manner such as when the application of the nonwoven fiber mat occurs before the application of the lead based active material paste. Further, in a specific embodiment, a nonwoven fiber mat is applied to a bottom surface of the first grid of lead alloy material, the lead based active material paste is applied to the first grid of lead alloy material and/or to the nonwoven mat, and then a second nonwoven fiber mat is applied to a top surface of the lead based active material paste.

At block 640, a second grid of lead alloy material is provided. At block 650, a lead oxide active material paste is applied to the second grid of lead alloy material to form a positive plate or electrode. At block 660, a nonwoven fiber mat as described herein is applied to a surface of the lead oxide active material paste, which may include the described mat impregnation or saturation. Alternatively, the application of the nonwoven fiber mat may occur before the application of the lead oxide active material paste as described herein. Further, in a specific embodiment, a nonwoven fiber mat is applied to a bottom surface of the second grid of lead alloy material, the lead oxide active material paste is applied to the second grid of lead alloy material and/or to the nonwoven mat, and then a second nonwoven fiber mat is applied to a top surface of the lead oxide active material paste.

At block 670, a separator is positioned between the first and second plates or electrodes to form a battery cell assembly. As described herein, the battery cell assembly may provide an emf of about 2.1 volts. At block 680, the battery cell assembly is positioned within a battery casing. Step 680 may be repeated so that multiple battery cell assemblies are positioned within a battery casing to provide a desired battery voltage (e.g., 6.3 volts, 12.6 volts, and the like). At block 690, the battery cell assembly is saturated with an electrolyte.

As described herein, the nonwoven fiber mats include a blend of a plurality of first coarse fibers and a plurality of second coarse fibers. The first coarse fibers may have fiber diameters ranging between about 6 µm and about 11 µm, 8 µm and about 11 µm, and the like, and the second coarse fibers may have fiber diameters ranging between about 10 µm and about 20 µm, 13 µm and about 20 µm, and the like. The nonwoven fiber mats may have similar fiber compositions or different compositions. Further, it should be noted that the above described steps of method 600 need not occur in a sequential order so that various steps are performed simultaneously and/or in a differing order.

EXAMPLES

Several nonwoven fiber mats having the fiber compositions described herein were manufactured and tested for tensile strength and thickness and the results are described below.

Figure 7A:
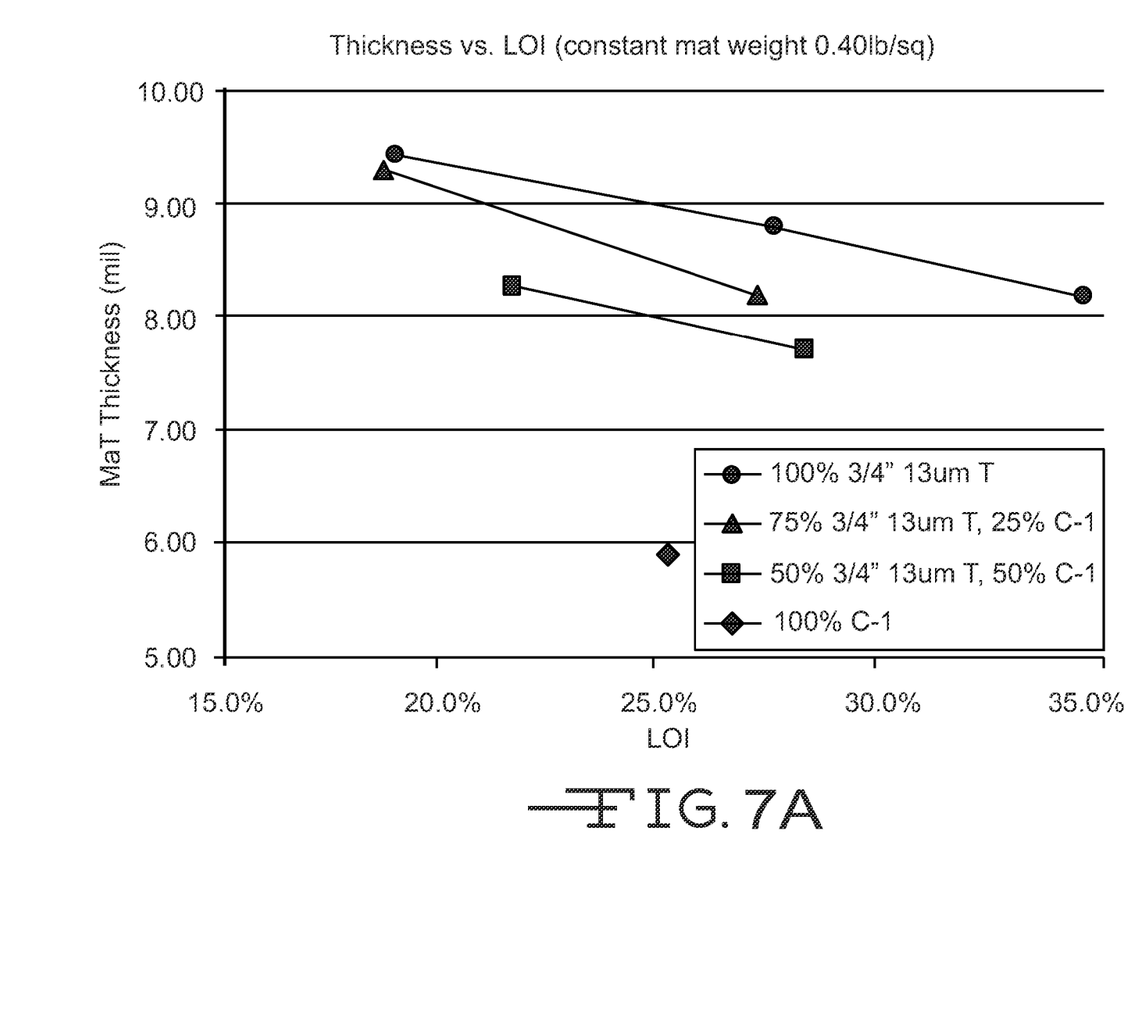
Figure 7B:
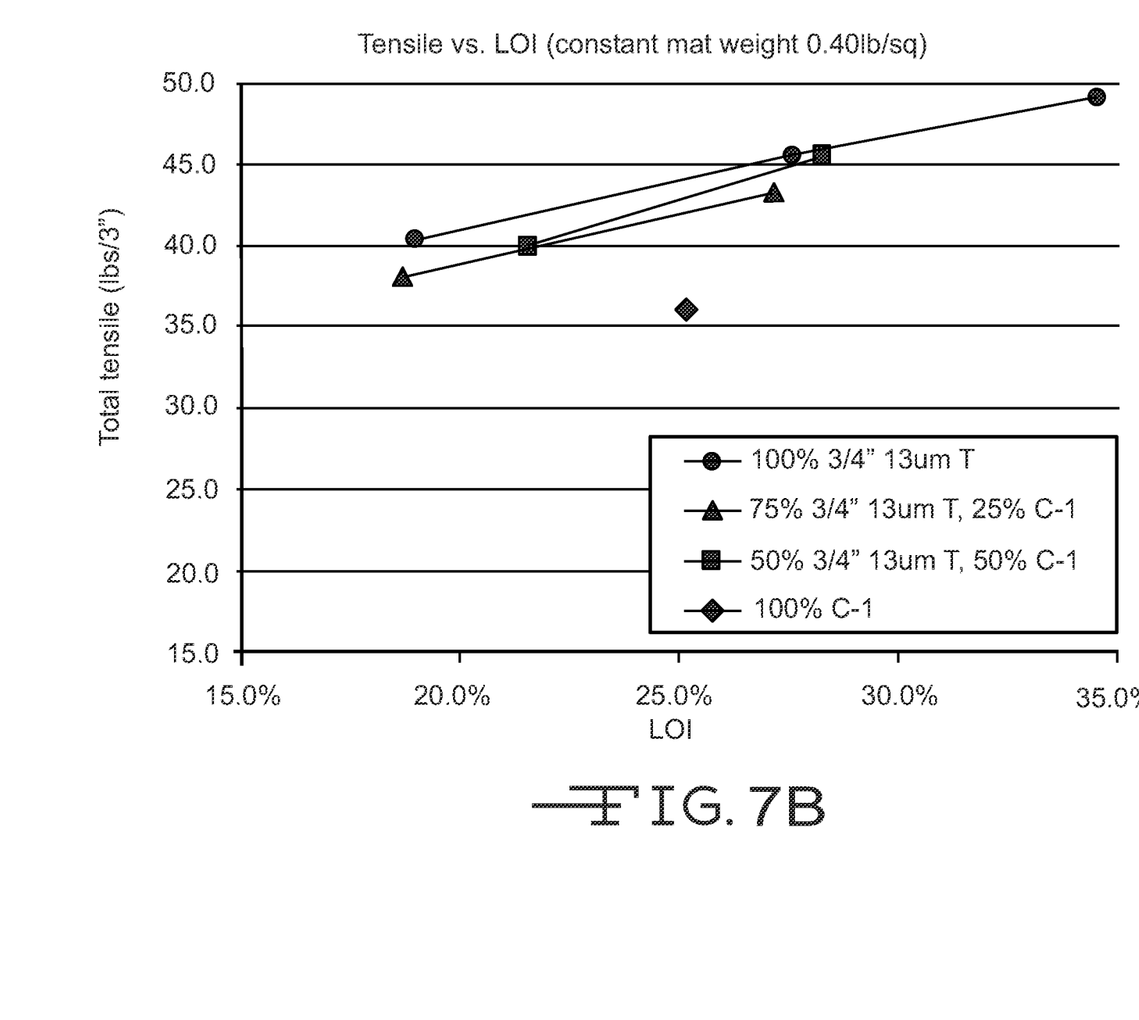

Referring to FIGS. 7A and 7B, illustrated are test results for several mats manufactured from two different glass fibers; specifically, ¾ inch 13 µm diameter T glass fibers and ⅓ inch 8 µm diameter C glass fibers ("C-1") bonded with an acrylic binder to make a 0.40 lb/sq mat. The illustrated graphs show the following four fiber mat compositions: 1) 100% of the T glass fibers; 2) 75% of the T glass fibers and 25% of the C-1 glass fibers; 3) 50% of the T and C-1 glass fibers; and 4) 100% of the C-1 glass fibers. FIG. 7A shows the relationship between mat thickness vs. acrylic binder content—i.e., loss on ignition (LOI)—at the different blending ratios. The mat thickness was reduced with higher content of the 8 µm C-1 glass fibers. FIG. 7A also shows that the two blended fiber mats had thicknesses of about 9 mils or less, with thickness decreasing as binder content increased.

FIG. 7B shows the relationship between the total tensile strength (machine direction tensile strength plus cross machine direction tensile strength) vs. LOI at the different blending ratios. The total tensile strength was reduced with higher content of the 8 µm C-1 glass fibers. As shown, the 50% T and C-1 glass fiber blending ratio with an LOI content of approximately 28% provides a mat with a good combination of thickness (i.e., less 8 mils) and tensile strength (greater than 40 lbs/3 inch). The increased percentage of finer C-1 fibers results in a thinner mat since the finer C-1 fibers are better packed. It is anticipated that an increase in length of the finer C-1 fibers, such as from ⅓ inch to ¾ inch, may increase the tensile strength of the resulting mat above that shown due to an increase in fiberglass surface area available for coupling with the binder and/or an increase in fiber junctions.

Figure 8A:
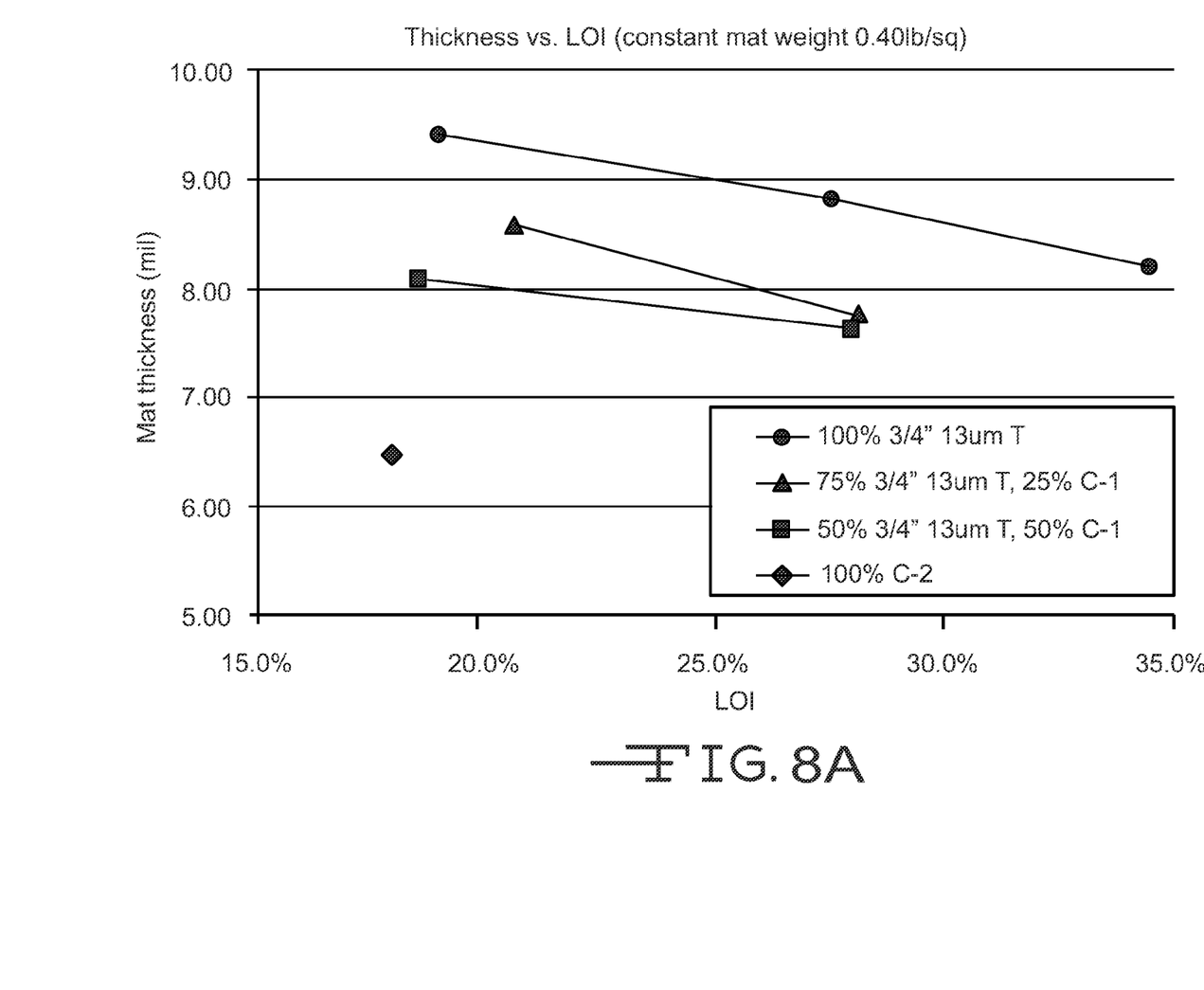
Figure 8B:
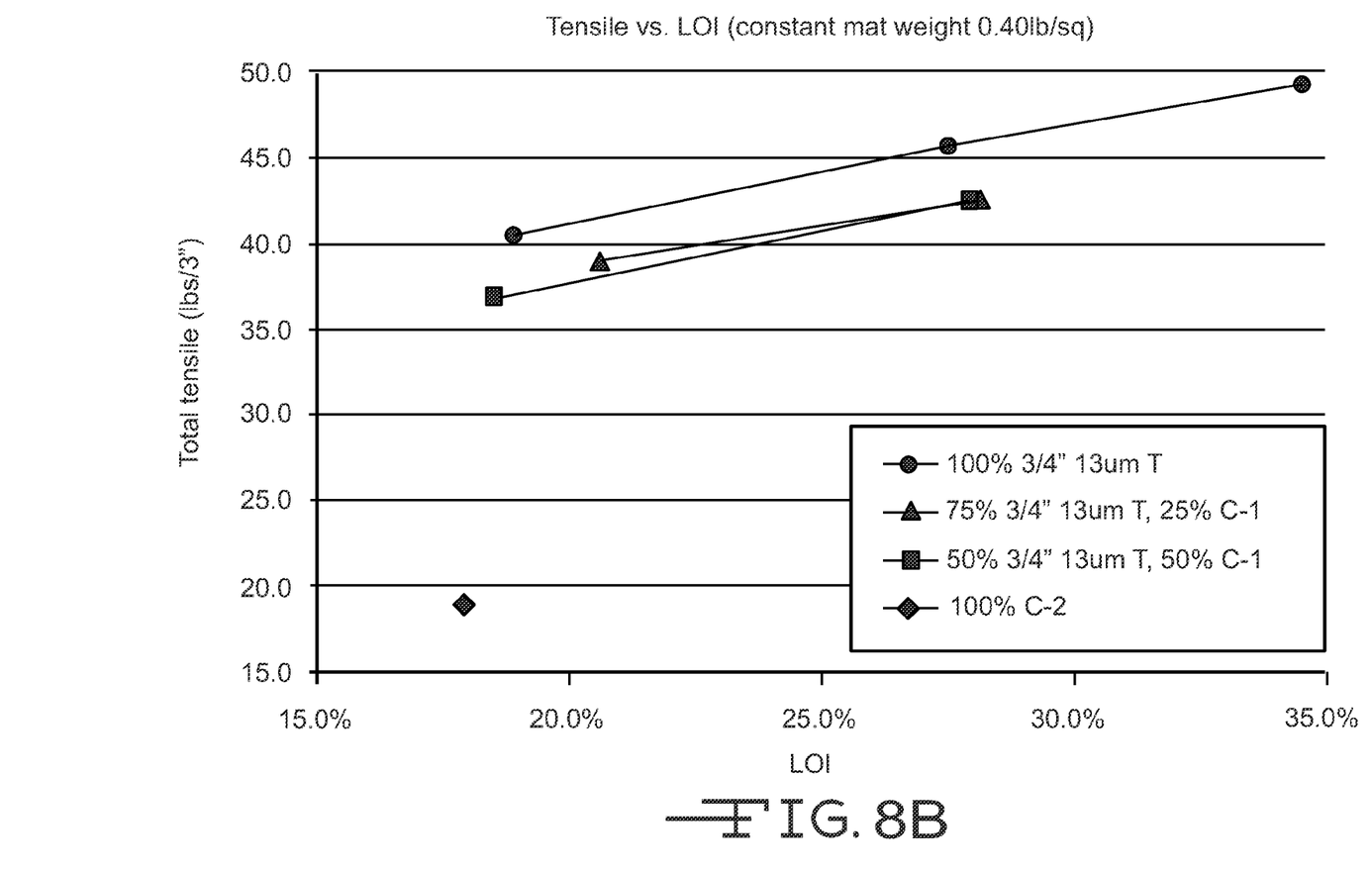

Referring to FIGS. 8A and 8B, illustrated are additional test results for mats manufactured from ¾ inch 13 µm diameter T glass fibers and ½ inch 10 µm diameter C glass fibers ("C-2") bonded with an acrylic binder to make a 0.40 lb/sq mat. The illustrated graphs show the following four fiber mat compositions: 1) 100% of the T glass fibers; 2) 75% of the T glass fibers and 25% of the C-2 glass fibers; 3) 50% of the T and C-2 glass fibers; and 4) 100% of the C-2 glass fibers. FIG. 8A shows the relationship between mat thickness vs. LOI at the different blending ratios while FIG. 8B shows the relationship between the total tensile strength vs. LOI at the different blending ratios. Mat thickness and tensile strength trends similar to those described for the blended fibers mats of FIGS. 7A and 7B are observed for the blended fiber mats shown in FIGS. 8A and 8B. For example, the 50% T and C-2 glass fiber blending ratio with an LOI content in the range of approximately 20% to 28% provide mats with a good combination of thickness (i.e., about 8 mils or less) and tensile strength (i.e. about 40 lbs/3 inch or greater).

Figure 9A:
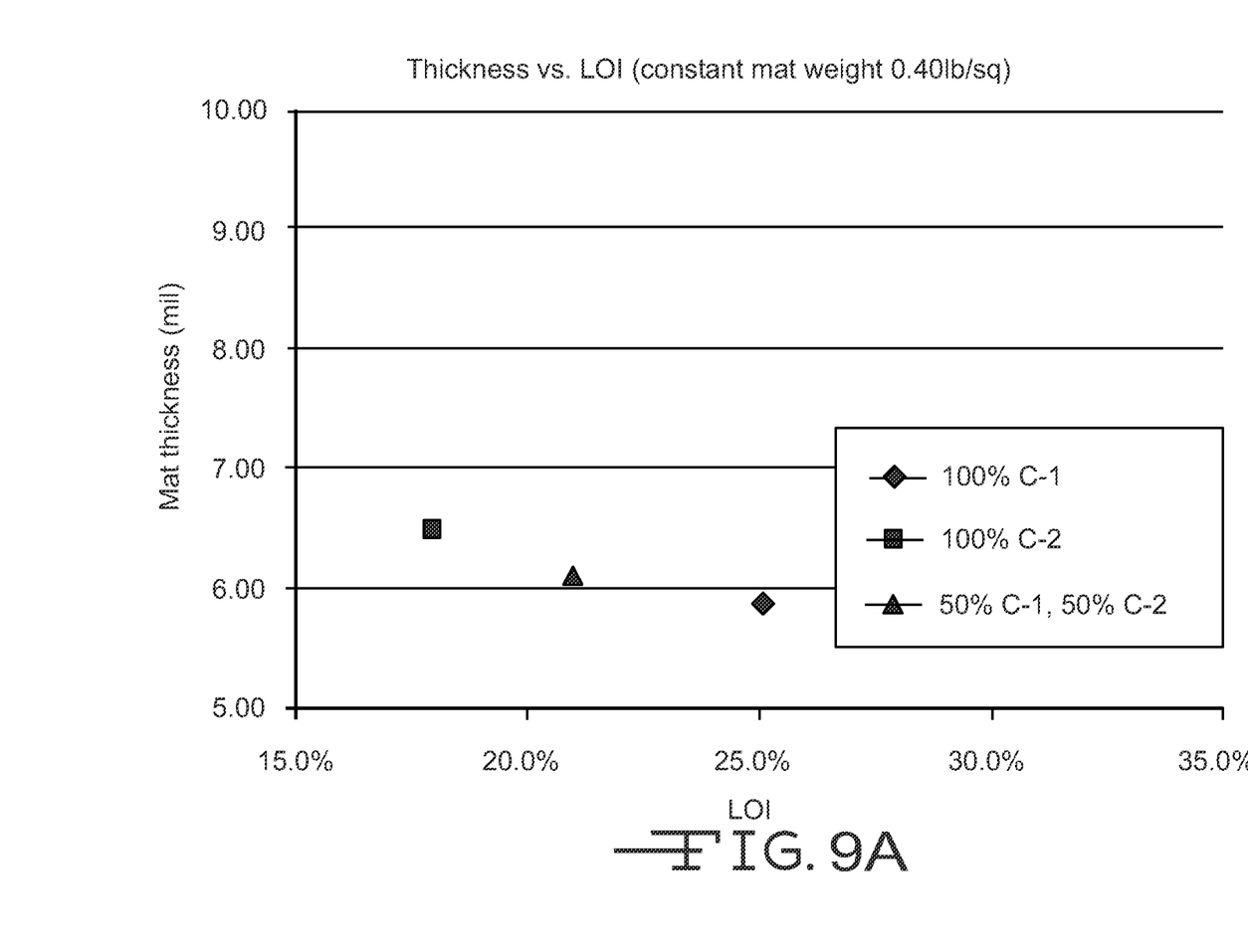
Figure 9B:
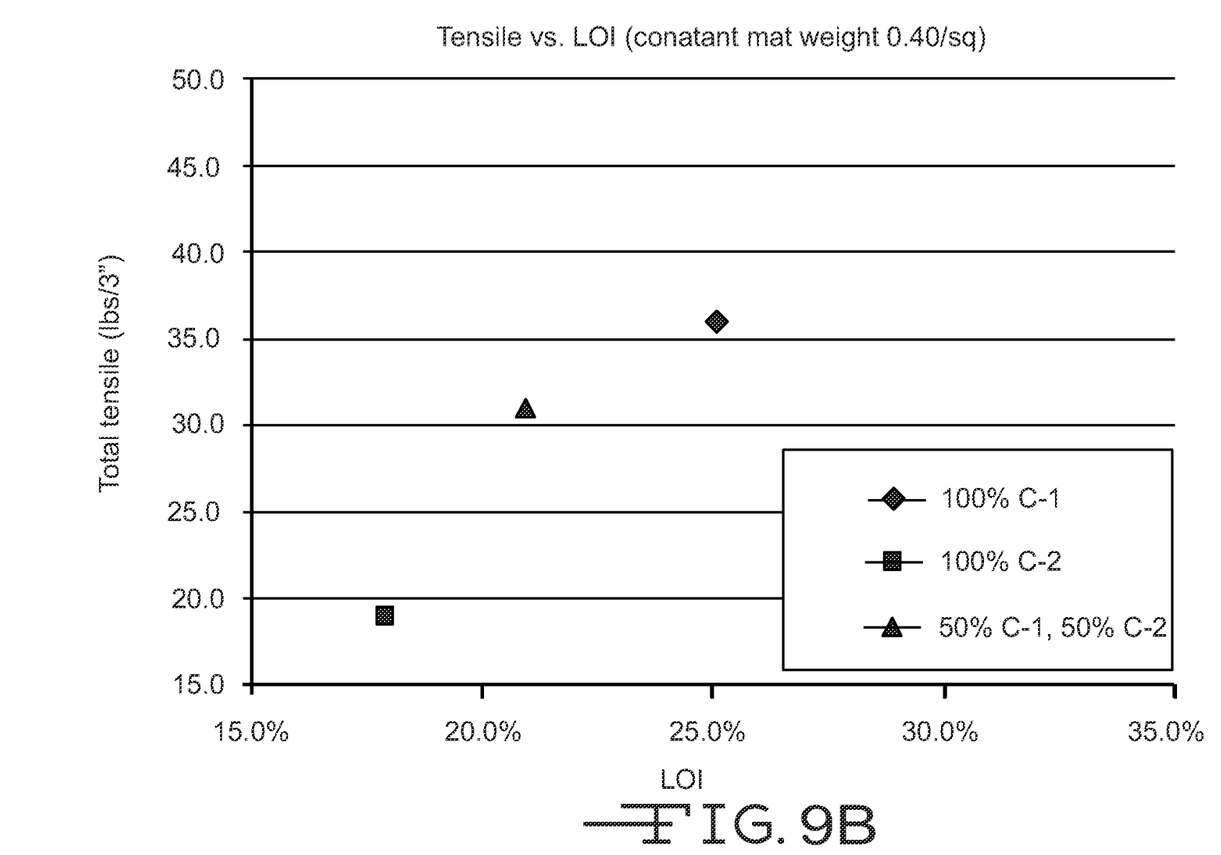

Referring to FIGS. 9A and 9B, illustrated are additional test results for mats manufactured from the C-1 and C-2 glass fibers bonded with an acrylic binder to make a 0.40 lb/sq mat. The illustrated graphs show the following three fiber mat compositions: 1) 100% of the C-1 glass fibers; 2) 100% of the C-2 glass fibers; and 3) 50% of the C-1 and C-2 glass fibers. FIG. 9A shows the relationship between mat thickness vs. LOI, while FIG. 9B shows the relationship between the total tensile strength vs. LOI at the different blending ratios. Blending of the C-1 and C-2 glass fibers produces a mat with intermediate thickness and tensile strength. As shown, the 50% C-1 and C-2 glass fiber blending ratio with an LOI content of approximately 21% provides a mat with minimal thickness (i.e., about 6 mils) while still providing acceptable tensile strength (i.e. above 30 lbs/3 inch), especially compared with the mat having 100% C-2 glass fibers.

Figure 10A:
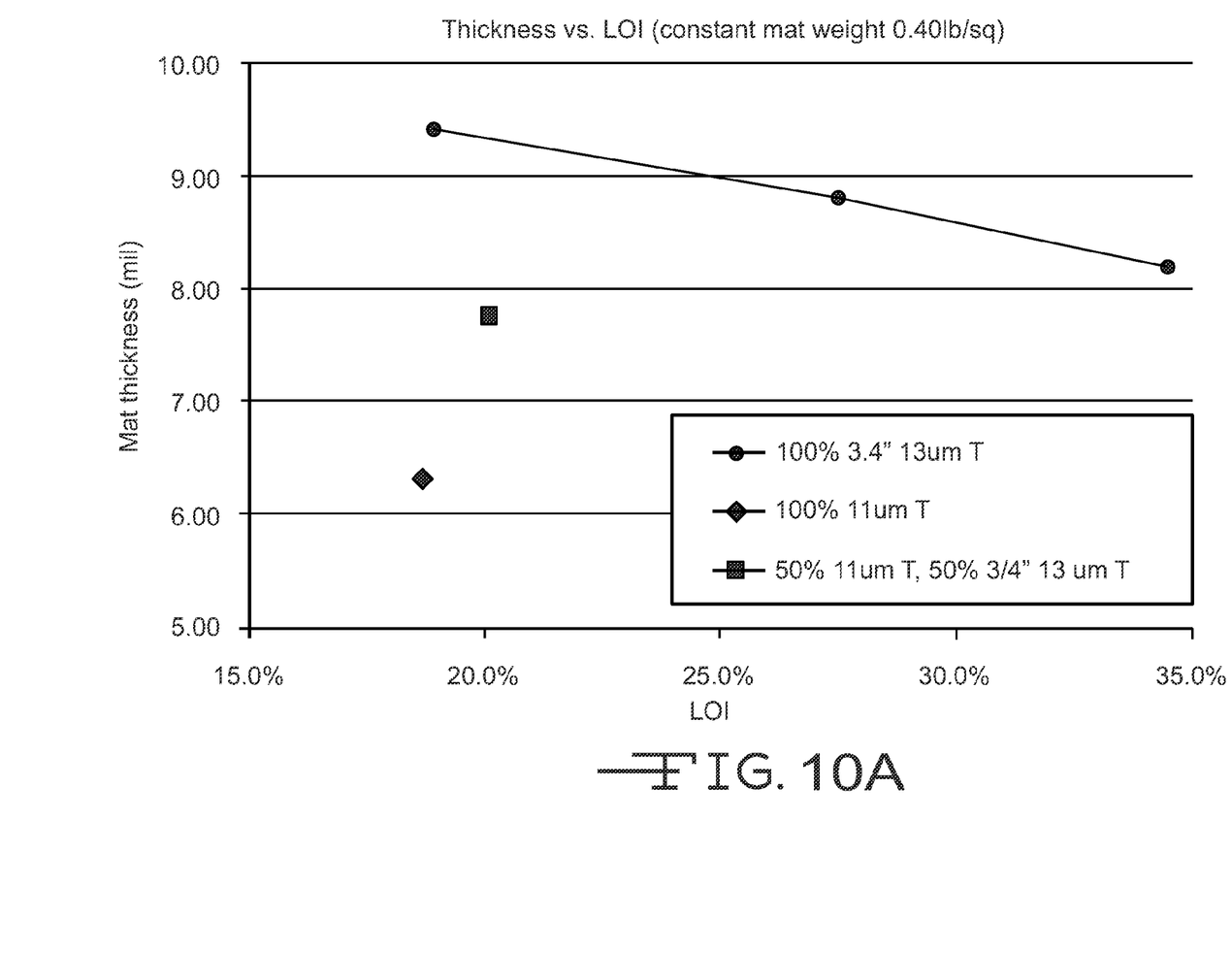
Figure 10B:
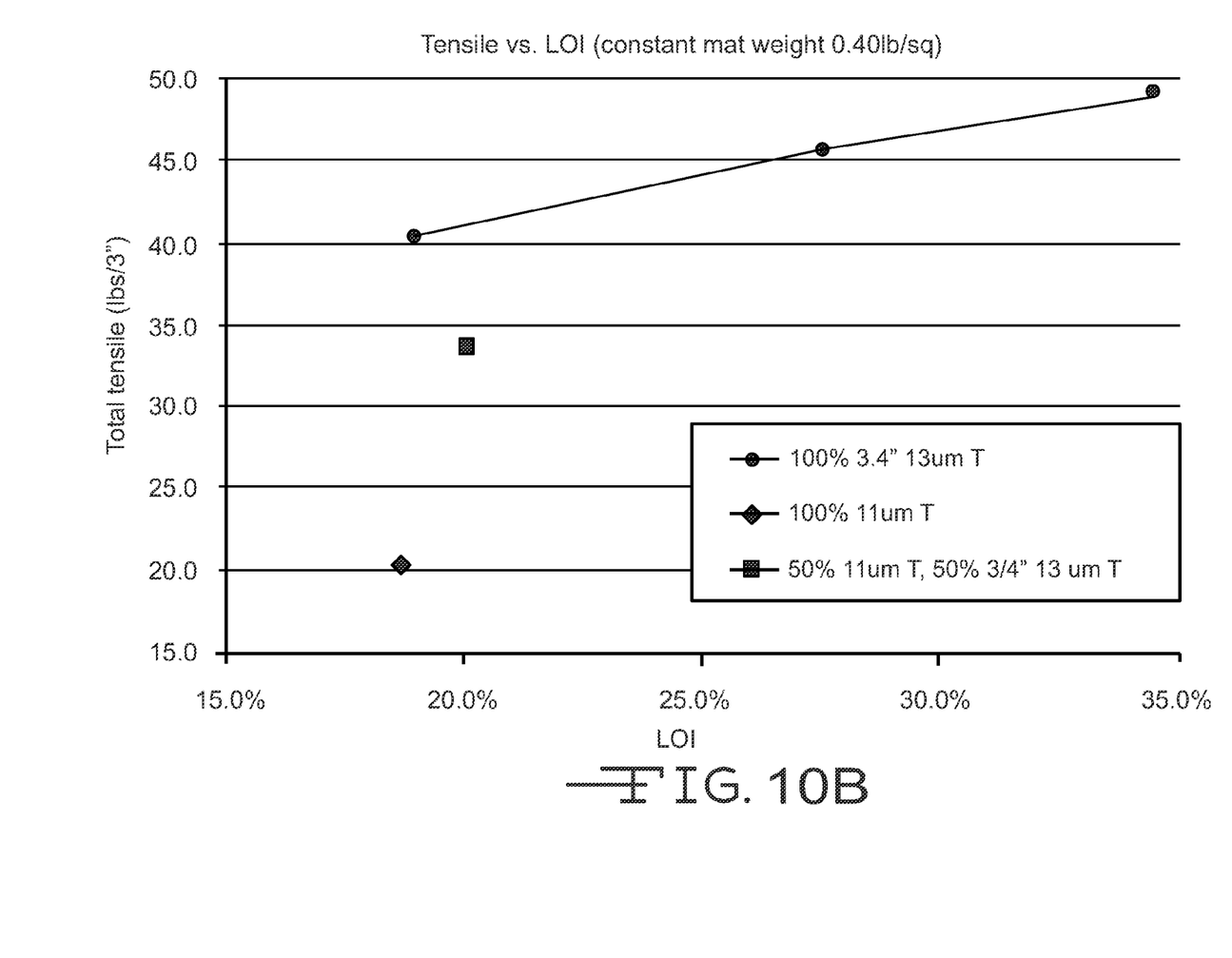

Referring to FIGS. 10A and 10B, illustrated are additional test results for mats manufactured from the ¾ inch 13 μm diameter T glass fibers and ½ inch 11 μm diameter T glass fibers bonded with an acrylic binder to make a 0.40 lb/sq mat. The illustrated graphs show the following three fiber mat compositions: 1) 100% of the 13 μm T glass fibers; 2) 100% of the 11 μm T glass fibers; and 3) 50% of the 13 μm and 11 μm T glass fibers. FIG. 10A shows the relationship between mat thickness vs. LOI, while FIG. 10B shows the relationship between the total tensile strength vs. LOI at the different blending ratios. Blending of the 13 μm and 11 μm glass fibers produces a mat with intermediate thickness and tensile strength. As shown, the 50% 13 μm and 11 μm glass fiber blending ratio with an LOI content of approximately 20% provides a mat with a good combination of thickness (i.e., less than 8 mils) and tensile strength (i.e. about 33 lbs/3 inch), especially compared with the mat having 100% 11 μm glass fibers.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A plate or electrode for a lead-acid battery comprising:
a grid of lead alloy material;
a paste of an active material applied to the grid of lead alloy material; and
a nonwoven fiber mat disposed on a surface of the paste of the active material, wherein the nonwoven fiber mat comprises a tensile strength in a machine direction of at least 22 lbs/3 inch and a tensile strength of at least 13 lbs/3 inch in a cross-machine direction, wherein the nonwoven fiber mat comprises a mat thickness of between about 0.006 inches and 0.008 inches, and wherein the fibers of the nonwoven fiber mat are composed entirely of a blend of coarse glass fibers having average fiber diameters of between 6 μm and 20 μm including:
a plurality of first coarse glass fibers having fiber diameters between 6 μm and 11 μm; and
a plurality of second coarse glass fibers having fiber diameters between 13 μm and 20 μm;
wherein the nonwoven fiber mat comprises between about 25% and 75% of the first coarse glass fibers and between 25% and 75% of the second coarse glass fibers.

2. The plate or electrode of claim 1, wherein the first and second coarse fibers comprise fiber lengths between about ⅓ inch and about 1½ inch.

3. The plate or electrode of claim 2, wherein the first and second coarse fibers comprise fiber lengths between about ½ inch and about ¾ inch.

4. The plate or electrode of claim 1, wherein at least one of the first coarse fibers or the second coarse fibers comprise fibers having a fiber length of at least ⅓ inch.

5. The plate or electrode of claim 4, wherein at least one of the first coarse fibers or the second coarse fibers comprise fibers having a fiber length of at least ½ inch.

6. The plate or electrode of claim 1, wherein the nonwoven fiber mat comprises about 50% of the first coarse fibers and about 50% of the second coarse fibers.

7. The plate or electrode of claim 1, wherein the paste of the active material penetrates into the nonwoven fiber mat between about 0.001 inches and about 0.020 inches from the surface of the paste or plate.

8. The plate or electrode of claim 1, wherein an additional nonwoven fiber mat is disposed on an opposite surface of the paste of the active material so that the paste of the active material and the electrode are disposed between two nonwoven fiber mats.

9. The plate or electrode of claim 8, wherein the two nonwoven fiber mats comprise opposite sides of a bag that encloses or envelopes the paste of the active material and the electrode.

10. The plate or electrode of claim 1, wherein the nonwoven fiber mat further comprises a binder applied to the mat between about 10% and 45% by weight of the mat.

11. The plate or electrode of claim 10, wherein the binder is applied to the mat between about 20% and 30% by weight of the mat.

* * * * *